US007957229B2

United States Patent
Ami

(10) Patent No.: US 7,957,229 B2
(45) Date of Patent: Jun. 7, 2011

(54) OPTICAL DISC CONTROLLER AND OPTICAL DISC DRIVE SYSTEM USING ERROR CORRECTION CODES

(75) Inventor: Yasuhiro Ami, Tokyo (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 590 days.

(21) Appl. No.: 12/007,465

(22) Filed: Jan. 10, 2008

(65) Prior Publication Data

US 2008/0175114 A1   Jul. 24, 2008

(30) Foreign Application Priority Data

Jan. 19, 2007  (JP) ................................. 2007-009737

(51) Int. Cl.
*G11B 27/10* (2006.01)
(52) U.S. Cl. .................................. 369/30.23; 369/47.33
(58) Field of Classification Search .......................... None
See application file for complete search history.

(56) References Cited

U.S. PATENT DOCUMENTS

2005/0063260 A1*  3/2005  Akiyama ................... 369/44.26
2005/0228960 A1*  10/2005  Francis et al. ................. 711/165

FOREIGN PATENT DOCUMENTS

JP    2002-319137 A    10/2002
JP    2004-199740 A    7/2004

* cited by examiner

*Primary Examiner* — Hoa T Nguyen
*Assistant Examiner* — Mark L Fischer
(74) *Attorney, Agent, or Firm* — Buchanan Ingersoll & Rooney PC

(57) ABSTRACT

An object of this invention is to provide an optical disc controller and an optical disc drive system which reduce the proceeding time for supplementing data that is deficient at the time of writing to the optical disc. The present invention relates to an optical disc controller and a optical disc drive system. An optical disc controller includes an interface circuit, a buffer, a memory manager, an ECC circuit, a modulation circuit, and an operation processor. The memory manager has a control register part, a copy transfer controller, and a buffer controller. The control register part further includes a copy sector number setting register for taking out and holding information of plural sector numbers of deficient data from a control signal of the operation processor. The copy transfer controller successively conducts copy transfer process for plural sector numbers based on the sector number information.

2 Claims, 17 Drawing Sheets

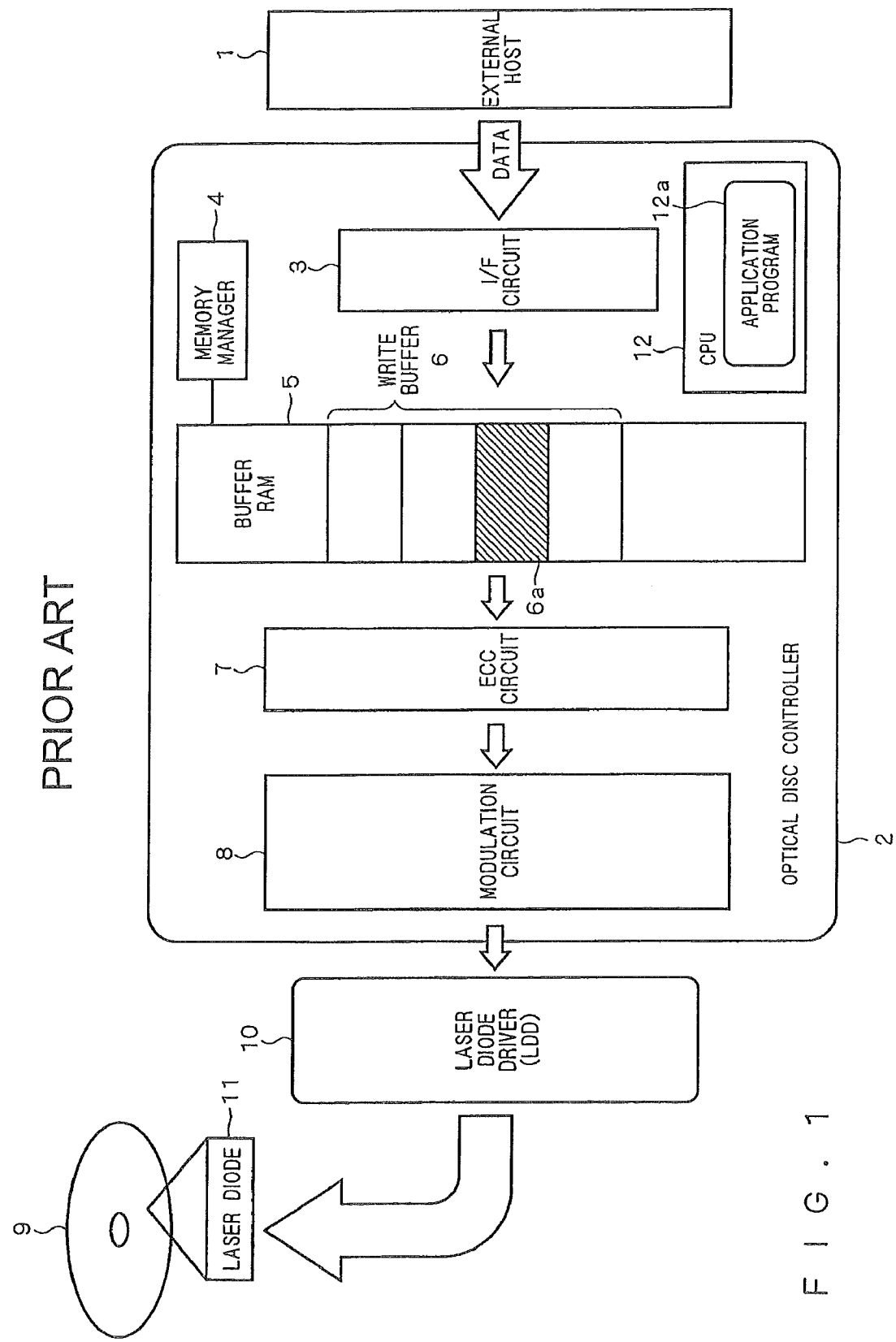
F I G. 1

OPTICAL DISC CONTROLLER AND OPTICAL DISC DRIVE SYSTEM USING ERROR CORRECTION CODES

BACKGROUND OF THE INVENTION

1. Field of the Invention

The present invention relates to an optical disc controller and an optical disc drive system, and in particular, to an optical disc controller and an optical disc drive system used for an optical disc in which data is recorded while being divided into data capacity units to which error correction code can be added.

2. Description of the Background Art

In a personal computer (hereinafter, also referred to as PC) or DVD recorder (hereinafter, also referred to as recorder), file data and moving image data is sometimes recorded in Blu-ray disc, DVD-RAM disc or the like using an optical disc drive. In such a case, file data or moving image data sent from the PC or recorder is recorded into the Blu-ray disc, DVD-RAM disc or the like while being divided into units of data capacity for which error correction code can be added in accordance with physical specification of the particular disc.

Here, data that is recorded into a Blu-ray disc, DVD-RAM disc or the like is treated in units of sectors each consisting of 2 KB. And a data capacity unit to which error correction code can be added in accordance with physical specification of each disc is 32 KB corresponding to 16 sectors in the case of DVD-RAM and 64 KB corresponding to 32 sectors in the case of Blu-ray.

Usually, recording instruction from a PC or a recorder to an optical disc drive is made by ATAPI (AT Attachment Packet Interface) command. In this ATAPI command, instruction is made by a logical address in which recording start position increases by a unit of one sector from zero, and a recording data capacity represented by a number of sectors. In an optical disc, this logical address is converted to a physical address on medium and used as a recording start position.

In this case, the converted physical address representing recording start position is not necessarily situated at a boundary of 32 KB in the case of DVD-RAM or at a boundary of 64 KB in the case of Blu-ray, but is generally in the middle of data capacity unit of 32 KB or 64 KB. Likewise, a physical address representing recording end position is generally in the middle of data capacity unit of 32 KB or 64 KB. In such a case, data is not written into the entire data capacity unit to which error correction code can be added in accordance with physical specification, so that there is deficient data.

According to a physical specification of a particular disc such as DVD-RAM or Blu-ray, when data deficiency occurs in writing to an optical disc, the deficient data is supplemented in a unit of sector using data on the optical disc or "0" data. Concretely, a physical specification defines that the deficiency is supplemented by data on the optical disc when data is already recorded in the same physical address for the deficient data on the optical disc, while the deficiency is supplemented by "0" data when data is not recorded on the optical disc.

As described above, in an optical disc drive, data is read out from boundary of 32 KB or 64 KB including a physical address of recording start position so as to supplement data, and the read out data is copied to the data that is deficient at the time of writing each sector. This series of processes is called "recording data merge process".

The process concerning an optical disc drive is described, for example, in Japanese Patent Application Laid-Open No. 2004-199740 and Japanese Patent Application Laid-Open No. 2002-319137.

However, occurrence of recording data merge process in an optical disc drive caused deterioration in recording performance compared to the case where recording data merge process does not occur. Concretely, the recording data merge process increases the processing time for reading out deficient data from the optical disc and the processing time for hardware and software that copies and transfers the read out data to a specific buffer. Therefore, processing time of hardware and software increases in the case where recording data merge process occurs, compared to the case where recording data merge process does not occur, leading deterioration in recording performance in the optical disc drive. However, in recording data merge process, the processing time for reading out data from the optical disc so as to supplement deficient data is essential for satisfying the physical specification.

SUMMARY OF THE INVENTION

It is an object of the present invention to provide an optical disc controller and an optical disc drive system capable of reducing the processing time of hardware and software for supplementing deficient data at the time of writing to optical disc.

The present invention relates to an optical disc controller for controlling reading and writing of data from/to an optical disc in which data is recorded while divided into data capacity units for which an error correction code can be added. And the optical disc controller according to the invention includes an interface circuit for controlling input/output of data with respect to an external device; a buffer for holding data inputted from said interface circuit in units for which said error correction code is added; a memory manager for controlling reading and writing of data from/to said buffer; an ECC circuit for adding said error correction code to data held in said buffer; a modulation circuit for modulating data for which said correction error code is added in said ECC circuit into a predetermined format; and an operation processor for controlling said interface circuit, said memory manager, said ECC circuit and said modulation circuit. Further, said memory manager includes: a control register part having a plurality of registers for taking out and holding information necessary for copy transfer from a control signal of said operation processor that instructs said buffer to copy and transfer reproduction data in units of sectors for deficient data, when the data inputted at the time of writing into said optical disc from said interface circuit does not fill the unit for which said error correction code is added; a copy transfer controller for controlling copy transfer to said buffer based on said information from said control register part; and a buffer controller for controlling reading and writing of said reproduction data from/to said buffer based on an instruction from said copy transfer controller. Said control register part further includes a copy sector number setting register for taking out and holding information of plural sector numbers of deficient data from said control signal of said operation processor. Said copy transfer controller successively executes copy transfer process on the plural sector numbers based on said sector number information.

Since the optical disc controller of the present invention successively conducts copy transfer process for plural sector numbers based on a copy sector number setting register for taking out and holding information of plural sector numbers of deficient data from a control signal of an operation processor, the time that has been required for setting process of every sector conducted in the operation processor is no longer necessary, so that the time for executing copy transfer process of deficient data can be reduced.

The present invention also relates to an optical drive system including a laser diode, an optical disc controller employing the aforementioned configuration, and a laser diode driver. The laser diode executes reading/writing of data from/to an optical disc in which data is recorded while divided into data capacity units for which an error correction code can be added. The laser diode driver converts output from said modulation circuit of said optical disc controller into an input signal for said laser diode.

Since the optical disc drive system of the present invention includes an optical disc controller employing the aforementioned configuration, the time that has been required for setting process of every sector conducted in the operation processor is no longer necessary, and it is possible to conduct reading and writing of data from/to the optical disc with reduced execution time of copy transfer process of deficient data.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 shows a block diagram of an optical disc drive system according to the first embodiment of the present invention;

DESCRIPTION OF THE PREFERRED EMBODIMENTS

First Embodiment

Figure 2:
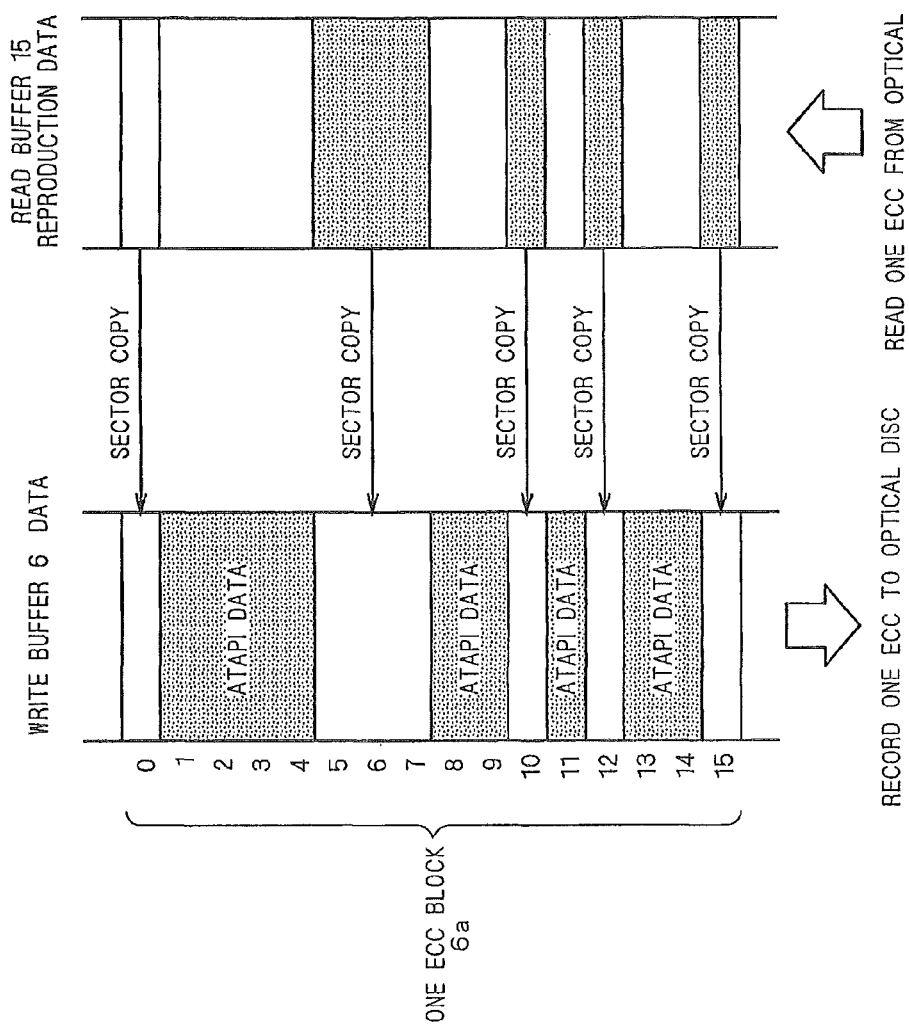
FIGS. 2 and 3 show schematic views of a buffer according to the first embodiment of the present invention.

In the present embodiment, when data in writing to an optical disc does not fill a data capacity unit to which an error correction code can be added (hereinafter, also referred to one ECC block), a memory manager successively executes transfer process for supplementing deficient data based on information about plural sector numbers. For example, by holding at a register, information of plural sector numbers corresponding to the data which are deficient in one ECC block, it is possible to successively execute the copying and transferring process without necessity of making setting for every sector by an operation processor.

First in a Blu-ray disc, DVD-RAM disc or the like, in recording file data or image data (hereinafter, simply referred to as "data"), an error correction code is added every 32 sectors in the case of Blu-ray disc and every 16 sectors in the case of DVD-RAM disc. FIG. 1 is an block diagram of an optical disc drive system according to the present embodiment. In the optical disc drive system shown in FIG. 1, data that is generated in an external host 1 which is an external device is sent in units of sectors (2 KB) from an I/F circuit (not shown) of ATAPI of external host, and inputted into an I/F circuit 3 of ATAPI of an optical disc controller 2.

The data inputted to the I/F circuit 3 is transferred to a write buffer 6 of a buffer RAM 5 (for example, formed by SDRAM) under control of a memory manager 4. The write buffer 6 is made up of a plurality of buffers each consisting of an unit of number of sectors to which an error correction code is added (one ECC block 6a). When the data written into the write buffer 6 reaches the number of sectors to which an error correction code is added (one ECC block 6a), it is outputted to an ECC circuit 7 where a correction code is added.

The data to which a correction code is added in the ECC circuit 7 is transferred to a modulation circuit 8 where it is modulated into a predetermined format for writing into an optical disc 9. The modulated data is outputted to a laser diode driver 10 as an output signal from the modulation circuit 8 of the optical disc controller 2. In the laser diode driver 10, the modulated data is converted into an input signal for a laser diode 11. In the laser diode 11, data is written into the optical disc 9 while laser output is controlled based on the input signal from the laser diode driver 10.

The optical disc controller 2 is provided with a CPU 12 for controlling the I/F circuit 3, the memory manager 4, the ECC circuit 7 and the modulation circuit 8. In the CPU 12, processes of respective circuits are executed in accordance with application software 12a.

Next, explanation will be made for the case where the data written into the write buffer 6 does not fill one ECC block 6a. In one ECC block 6a (16 sectors) of the write buffer 6 shown in FIG. 2, inputted data is written into 9 sectors, namely, sector numbers 1-4, 8, 9, 11, 13 and 14, and data is deficient in the remaining sectors. Accordingly, for adding an error correction code to the one ECC block 6a, it is necessary to execute a recording data merge process for supplementing the sector where data is deficient.

As a supplementing method, when data is already recorded in the physical address on the optical disc corresponding to the deficient sector, the recorded data is read out and temporally read into a read buffer 15 of the buffer RAM 5 as reproduction data. Then data corresponding to the deficient sector is extracted from the reproduction data in the read buffer 15, and copied and transferred to the write buffer 6. That is, in the one ECC block 6a shown in FIG. 2, reproduction data in the read buffer 15 is sector-copied into seven sectors of sector numbers 0, 5-7, 10, 12, and 15.

Figure 3:
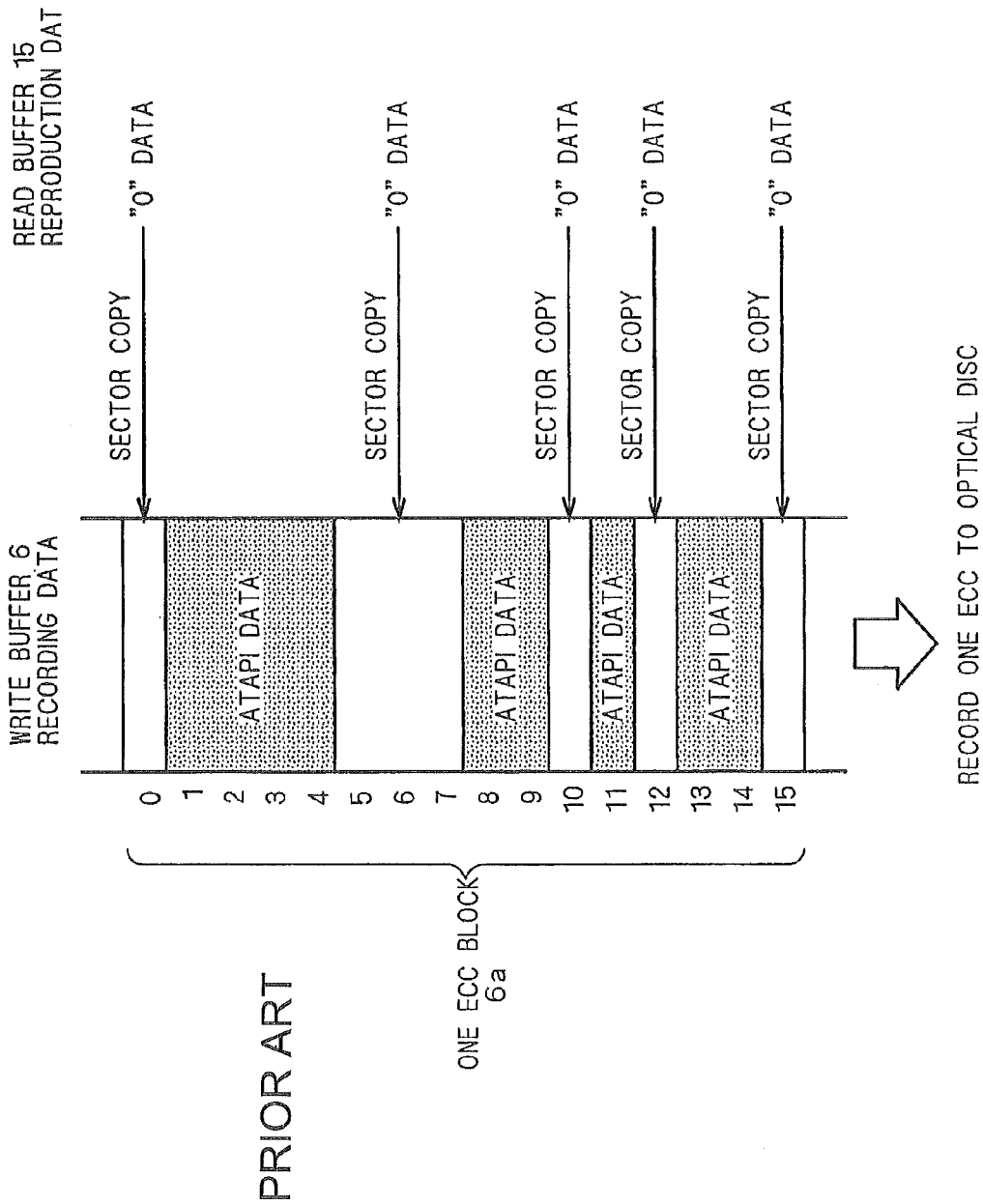

On the other hand, when no data is recorded in the physical address on the optical disc corresponding to the deficient sector (in the case of unrecorded), as shown in FIG. 3, "0" data is sector-copied into the data which is deficient in one ECC block 6a as reproduction data. The forgoing recording data merge process is a procedure that is defined by physical specification of the disc.

Figure 4:
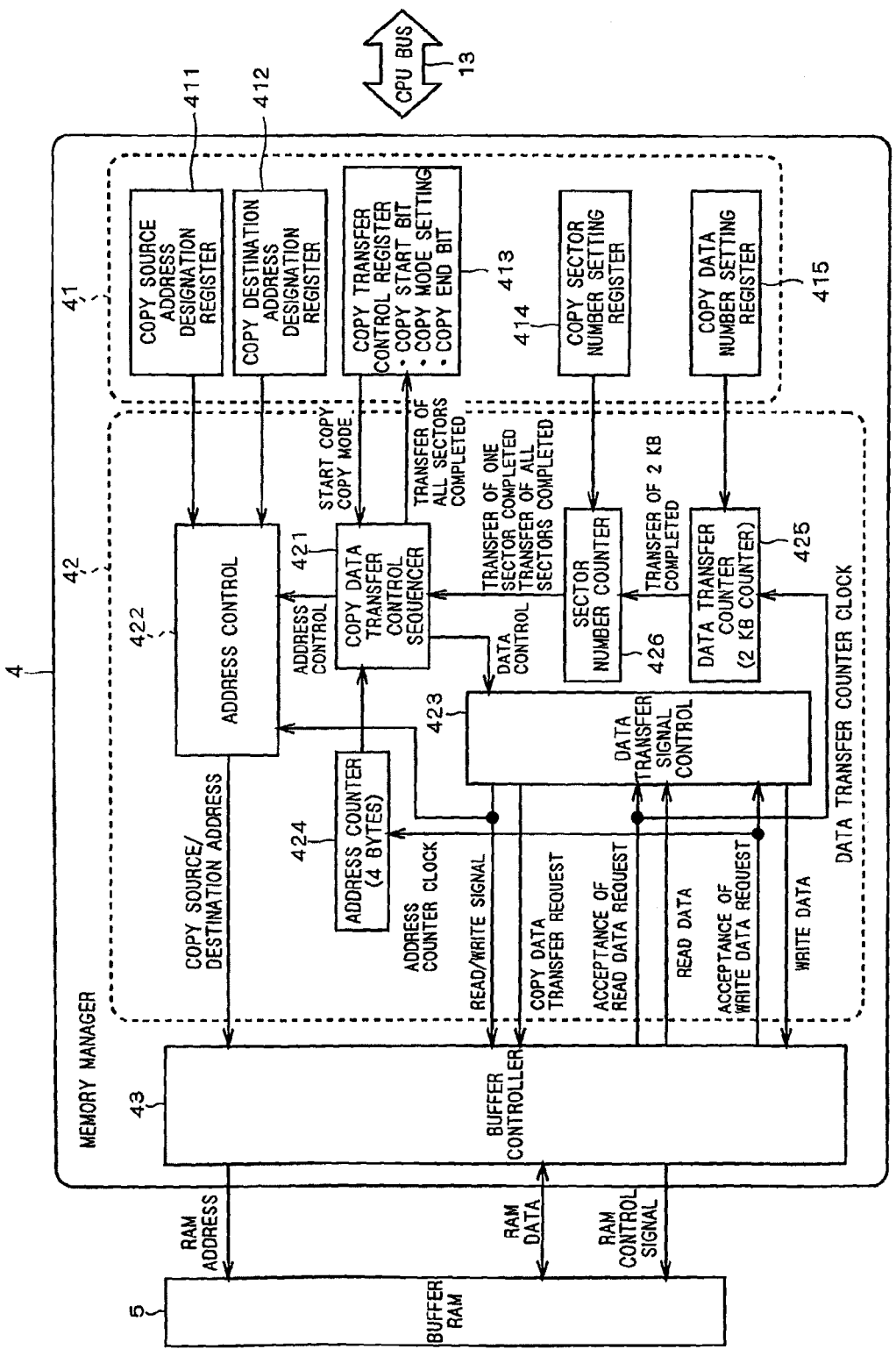
FIG. 4 shows a block diagram of an optical disc controller which is a base for the first embodiment of the present invention.
Figure 5:
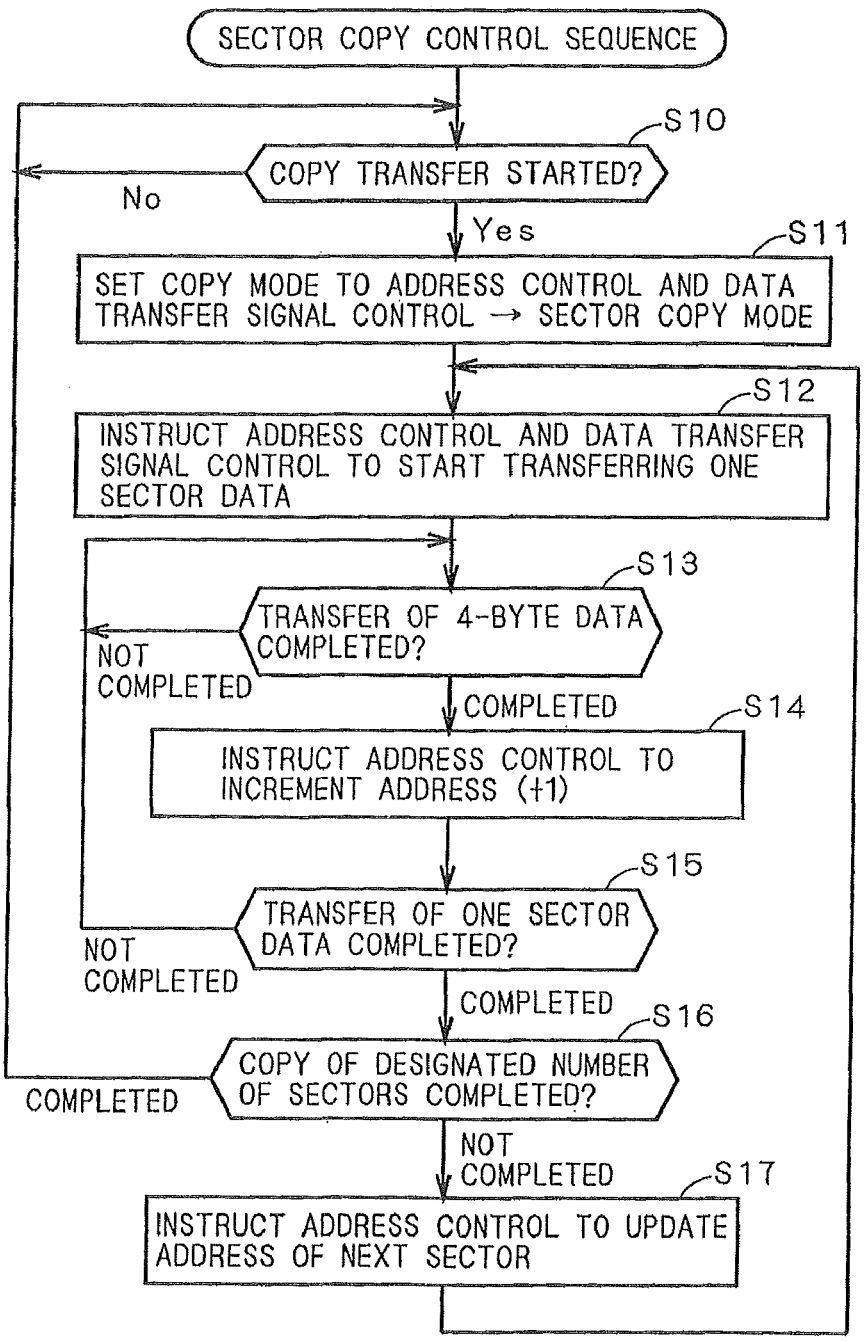
FIG. 5 shows a flow chart for explaining operation of copy data transfer control sequencer which is a base for the first embodiment of the present invention.
Figure 6:
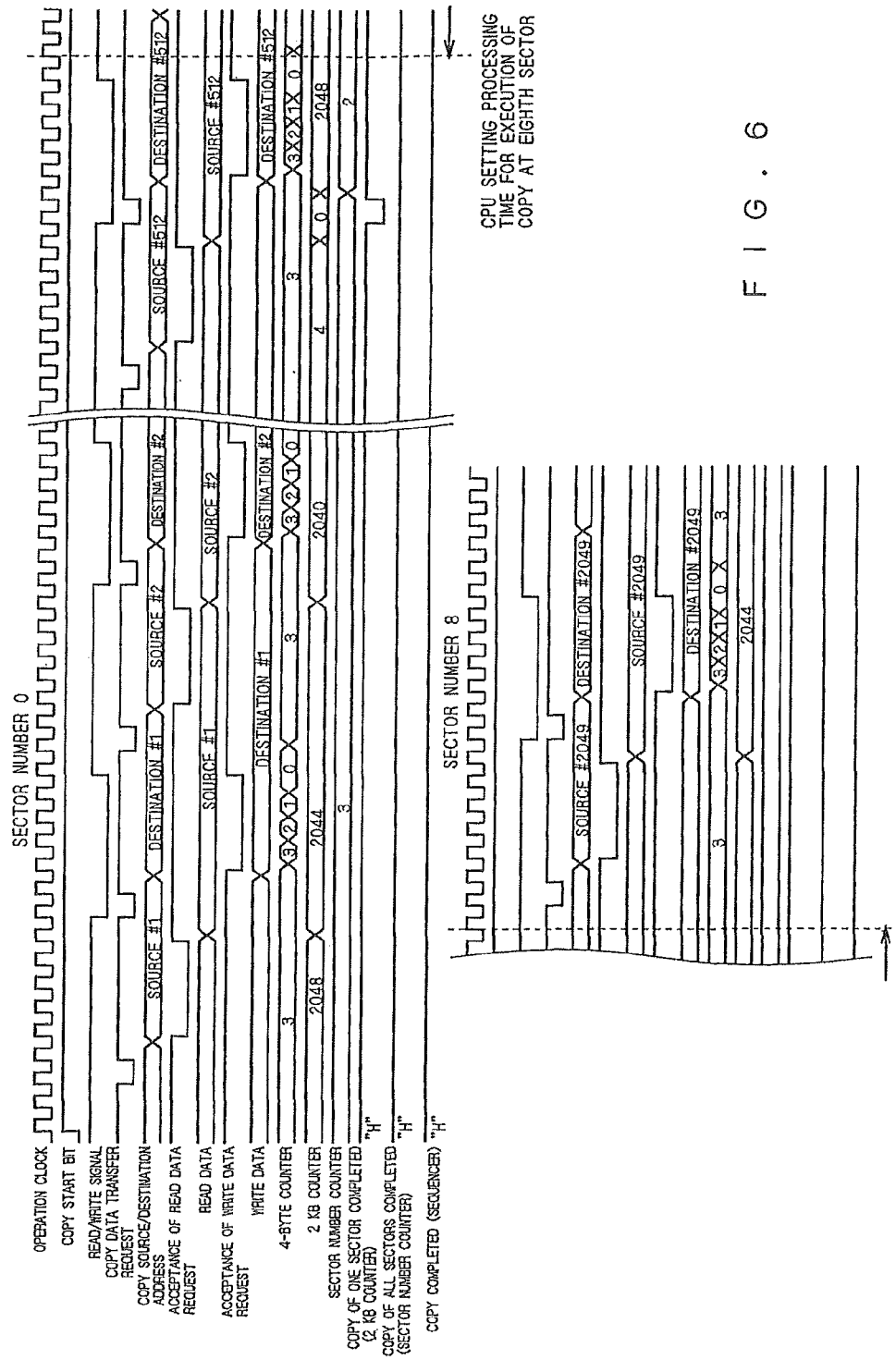
FIG. 6 shows a waveform chart for explaining operation of an optical disc controller which is a base for the first embodiment of the present invention.
Figure 7:
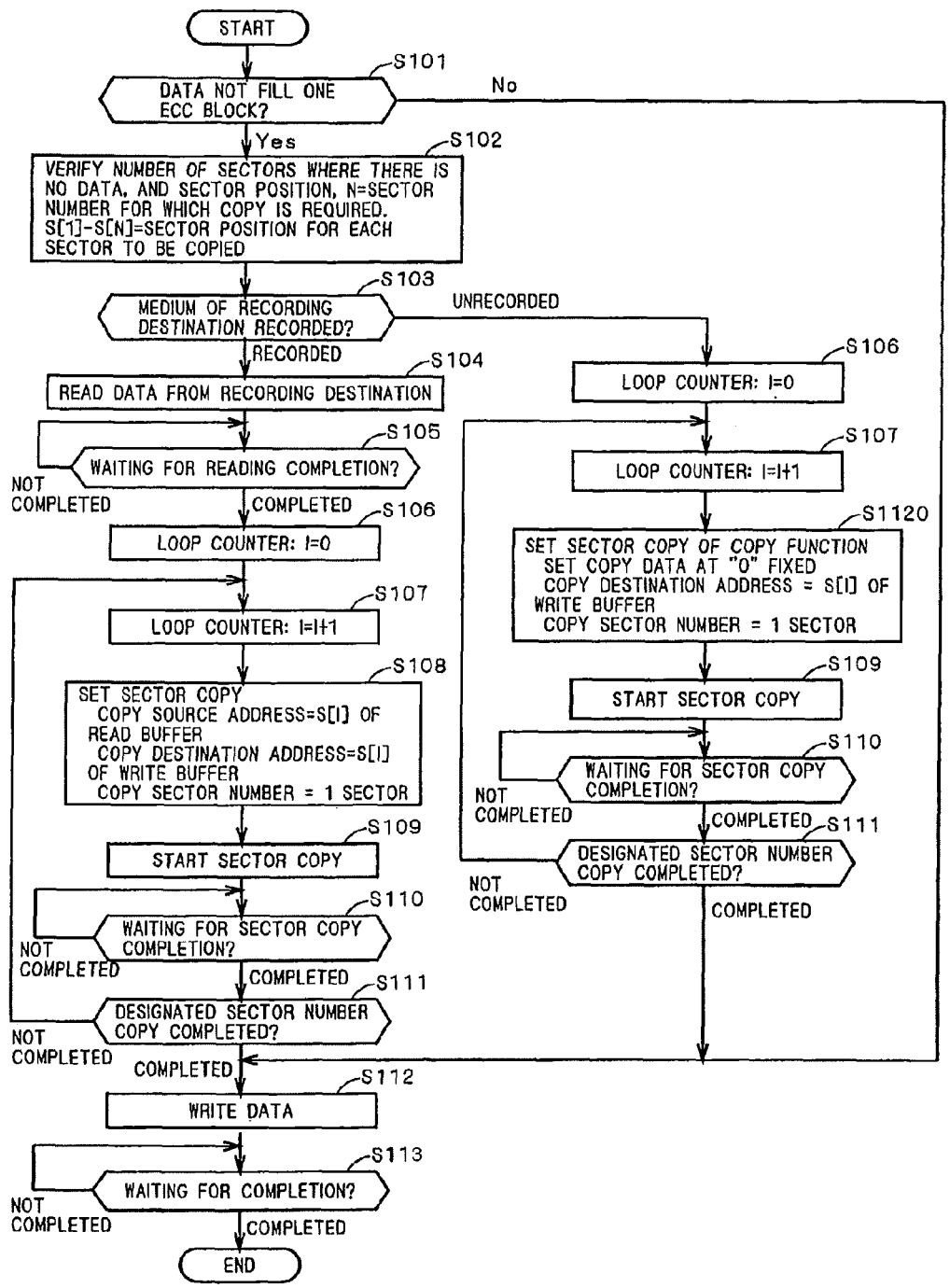
FIG. 7 shows a flow chart for explaining operation of an optical disc controller which is a base for the first embodiment of the present invention.

Next, explanation will be made for the conventional optical disc controller and optical disc drive system that have been used for satisfying the physical specification. FIG. 4 is a block diagram of a memory manager provided in a conventional optical disc controller, and FIG. 5 shows a flow chart of sector copy (copy transfer) in a conventional optical disc controller. FIG. 6 shows a signal waveform in a sector copy process in a conventional optical disc controller, and FIG. 7 shows a flow chart of a recording data merge process in a conventional optical disc controller. First, in Step S101 shown in FIG. 7, the CPU 12 determines whether data inputted from the external host 1 fills one ECC block 6a. Further, the CPU 12 verifies a number of sectors, and sector number(s) where data is deficient in Step S102 shown in FIG. 7, and verifies presence/absence of record on the optical disc corresponding to the sector number(s) of data that is deficient in Step S103. When it is determined in Step S103 that recording is made on the optical disc, reproduction data is read out from the optical disc which is destination for recording, and stored in the read buffer 15 in Step S104. Step S105 is a process of waiting for completion of reading out process of data from the optical disc.

Next, in Step S106, a loop counter for counting a number of sectors of sector copy is reset to zero, and in Step S107, the loop counter is incremented by one. In Step S107, information which is necessary for copy transfer, such as copy source address corresponding to sector number in the read buffer 15, copy destination address corresponding to sector number in the write buffer 6, and number of copy sectors is instructed to the memory manager 4, whereby settings for sector copy are made. In Step S108, sector copy is started in accordance with the settings in Step S107. Step S110 is a process of waiting for completion of sector copy process.

Next, in Step S111, it is determined whether process for the number of sectors for which copying is necessary verified in Step S102 has completed, and if not completed, the flow returns to Step S107, and if completed, the flow proceeds to Step S112 where data writing process is executed. Step S113 is a process of waiting for completion of data writing process.

On the other hand, when it is determined in Step S103 that recording is not made on the optical disc (unrecorded), principally the process is generally similar to that of Step S106 to Step S111 except that reproduction data to be copied is fixed at "0", and copy source address is not designated. To be more specific, when it is determined as "unrecorded" in Step S103, reproduction data to be copied in Step S120 is fixed at "0", and information necessary for copy transfer such as copy destination address and number of copy sectors is instructed to the memory manager 4. When it is determined in Step S103 as "unrecorded", the same processes as in Step S106 to Step S111 are denoted by the same reference numerals and detailed description thereof will be omitted.

The memory manager 4 shown in FIG. 4 receives a control signal including address and data from the CPU 12 via a CPU bus 13, in Steps S108, S120 shown in FIG. 7. In the memory manager 4, a control register part 41 shown in FIG. 4 takes out and holds information necessary for copy transfer. To be more specific, in the control register part 41, copy source address is held in a copy source address designation register 411, a copy destination address designation register 412 holds copy destination address, and a copy transfer control register 413 holds copy start bit, copy mode setting and copy end bit. The control register part 41 is also provided with a copy sector number setting register 414 for holding number of sectors to be copied, and a copy data number setting register 415 for setting number of copied data.

Further, the memory manager 4 shown in FIG. 4 has a copy transfer controller 42 for controlling copy transfer based on the information held in the control register part 41. The copy transfer controller 42 executes sector copy process while a copy data transfer control sequencer 421 controls address control 422 and data transfer signal control 423. In the memory manager 4 shown in FIG. 4, an address counter 424 is provided for control because data is copied and transferred in units of 4 bytes as can be seen from the waveform of 4-byte counter shown in FIG. 6. Further, in the memory manager 4 shown in FIG. 4, a data transfer counter 425 for counting data capacity of one sector (2 KB) and a sector number counter 426 for counting number of sectors that is copied and transferred are provided. Reading and writing processes of data from/to the buffer RAM 5 are executed via a buffer controller 43.

Next, concrete process of the copy data transfer control sequencer 421 will be explained with reference to FIG. 5. First, in Step S10, whether the CPU 12 has instructed to start copy transfer is determined. Upon starting of copy transfer, the address control 422 and the data transfer signal control 423 are instructed to set copy mode at sector copy mode in Step S11. Further, in Step S12, instruction for copy transfer of data of one sector is give to the address control 422 and the data transfer signal control 423 are instructed to copy and transfer data of one sector.

Then in Step S13, as shown in read data and write data of FIG. 6, data of 4 bytes is transferred for every address (#1, #2 etc.). Upon completion of data transfer of 4 bytes in Step S13, the address control 422 is instructed to increment address in Step S14. In the waveform of copy source/destination address shown in FIG. 6, the number is incremented in the order of copy source #1 address, copy destination #1 address, copy source #2 address, and copy destination #2 address in accordance with pulse of copy data transfer request. Further, in Step S15, whether data transfer of one sector has completed is determined, and if not completed, the flow returns to Step S13, and if completed, the flow proceeds to Step S16. In the waveform of 2 KB counter shown in FIG. 6, the 2 KB counter turns to 0 from 2048 to complete data transfer of one sector completes.

Then in Step S16, whether copy and transfer of the number of sectors designated by the CPU 12 has completed is determined, and if completed, the flow returns to Step S10, and if not completed, the flow proceeds to Step S17. In Step S17, the address control 422 is instructed to update address of the next sector, and then the flow returns to Step S12.

As described above, in the conventional optical disc controller and optical disc drive system, if data is recorded on the optical disc, the data is read out, whereas if data is not recorded, "0" data is copied in units of sectors into the site where data inputted from the I/F circuit 3 is deficient. As a result, the inputted data fills the one ECC block, and it is written into the optical disc after being added with an error correction code.

However, in the conventional optical disc controller and optical disc drive system, in conducting sector copy, it is necessary for the CPU 12 to make a setting for sector copy for every sector as shown in Step S106 to Step 110 in FIG. 7 and give instruction to the memory manager 4. In other words, in the conventional optical disc controller and optical disc drive system, the processing time required for the CPU 12 to make a setting of next sector copy by execution of software is repeated a number of times corresponding to copy number, in addition to the time required for the memory manager 4 to conduct sector copy. In the waveform shown in FIG. 6, the eighth sector is illustrated as a CPU setting processing time for executing sector copy. In a conventional optical disc controller or the like, such processing time is inserted every time the sector changes, so that the processing time for supplementing data which is deficient in writing to the optical disc (recording data merge process) increases.

Figure 8:
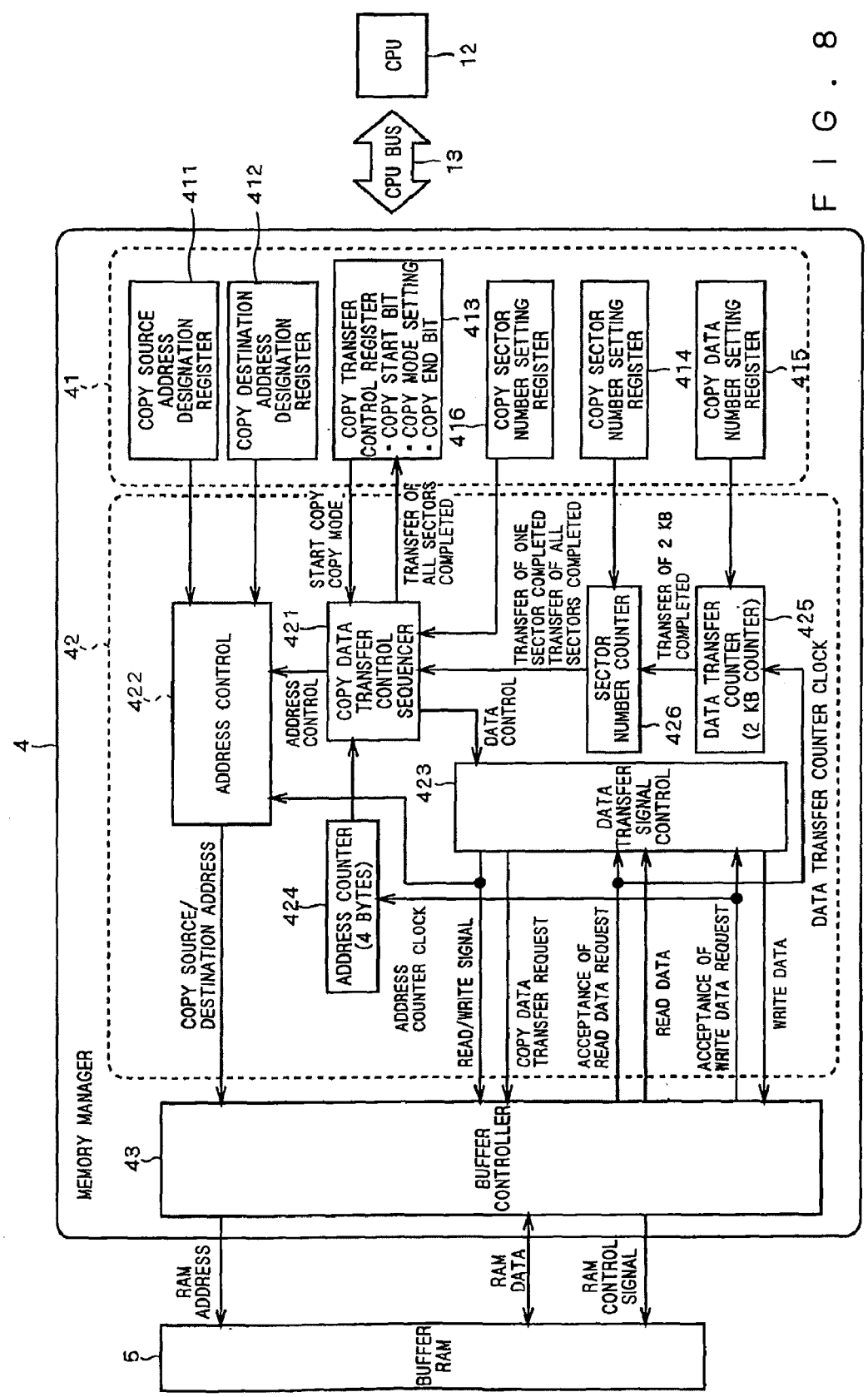
FIG. 8 shows a block diagram of an optical disc controller according to the first embodiment of the present invention.
Figure 9:
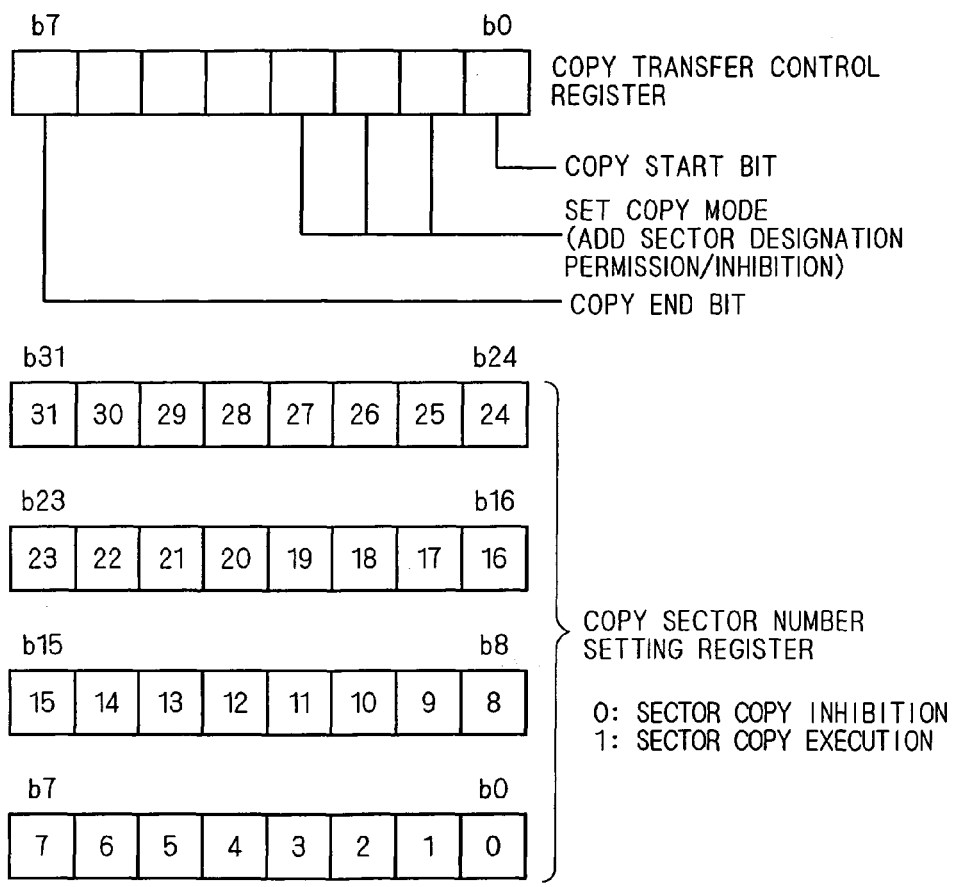
FIG. 9 shows schematic views of a copy transfer control register and a copy sector number setting register according to the first embodiment of the present invention.
Figure 10:
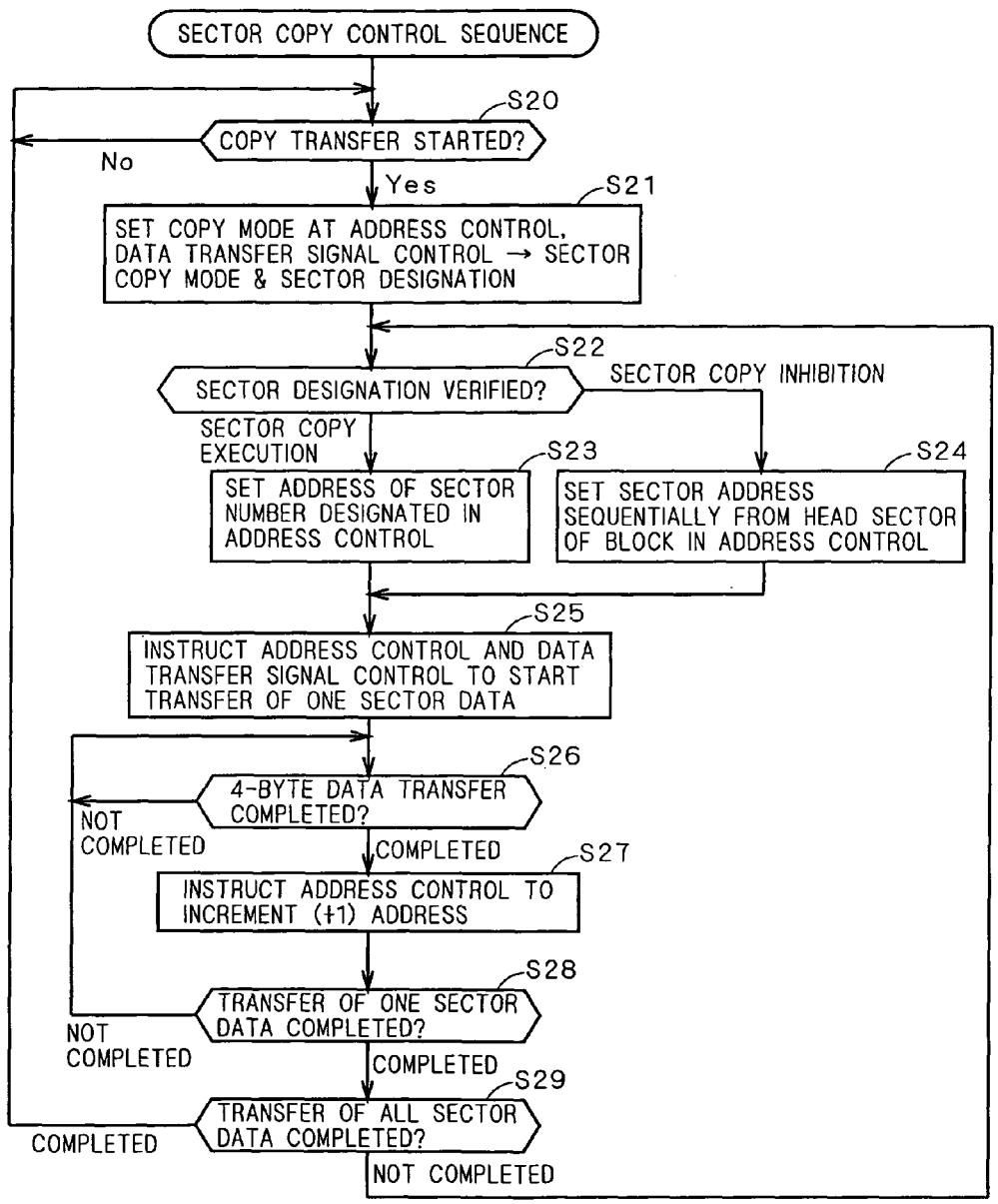
FIG. 10 shows a flow chart for explaining operation of a copy data transfer control sequencer according to the first embodiment of the present invention.
Figure 11:
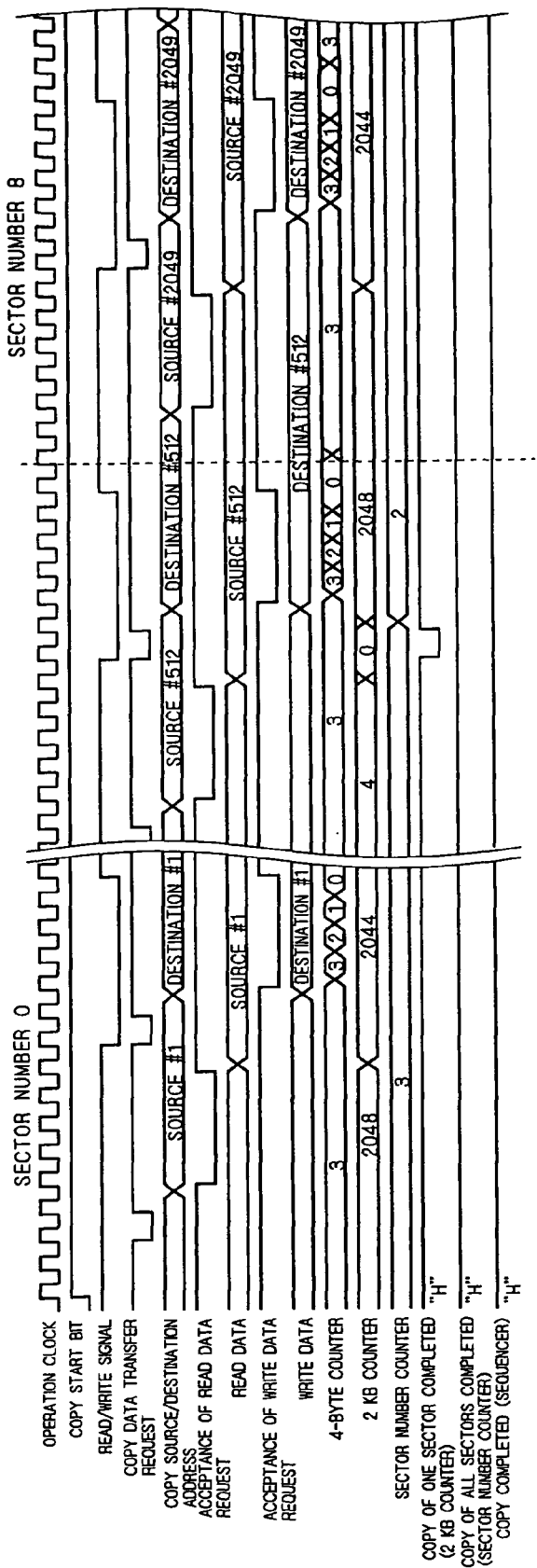
FIG. 11 shows a waveform chart for explaining operation of an optical disc controller according to the first embodiment of the present invention.
Figure 12:
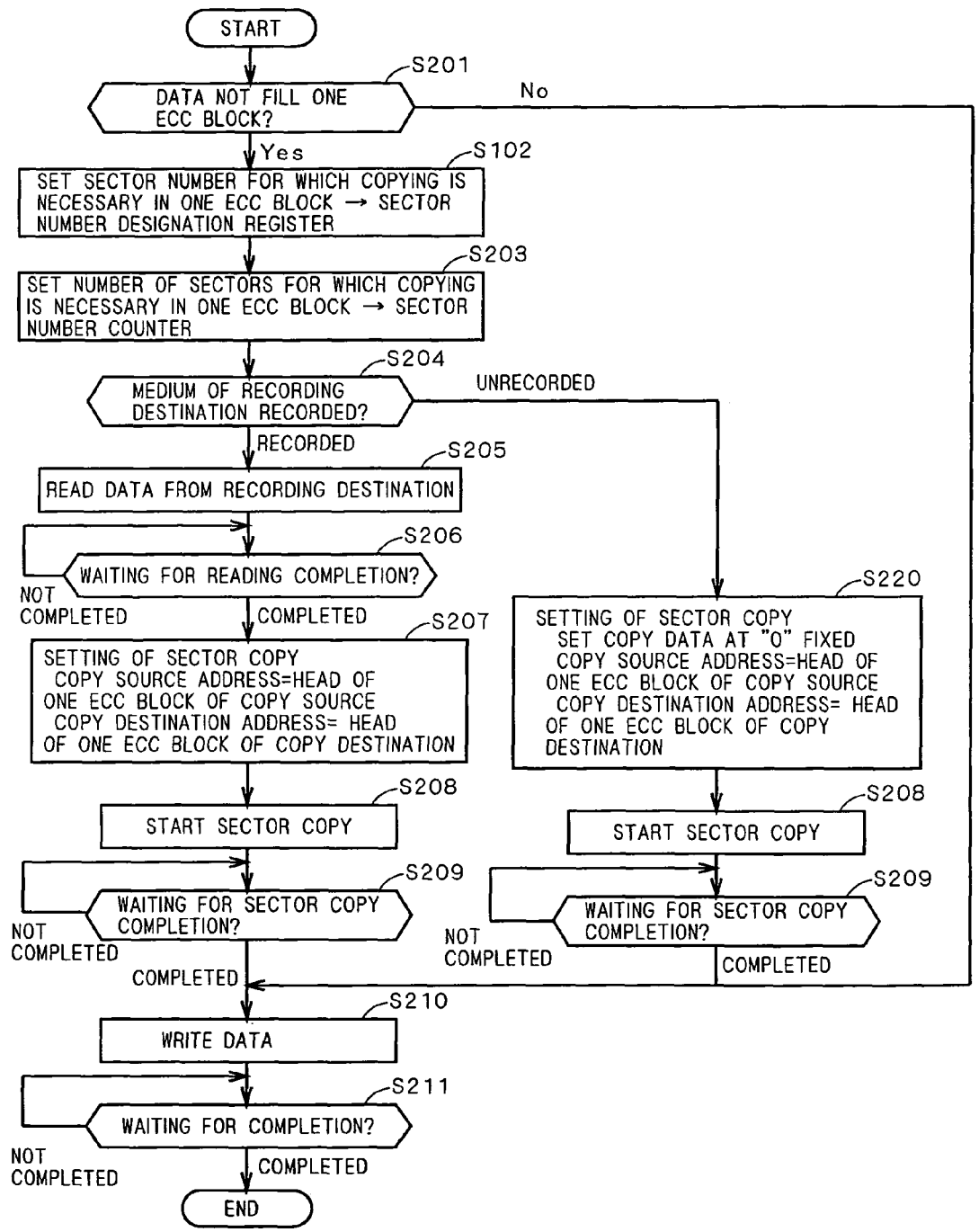
FIG. 12 shows a flowchart for explaining operation of an optical disc controller according to the first embodiment of the present invention.

In consideration of this, the optical disc controller and optical disc drive system according to the present invention intends to reduce the recording data merge processing time by employing the structure of memory manager shown in FIG. 8 in the optical disc controller. In the following, the optical disc controller and optical disc drive system according to the present embodiment will be described with reference to FIG. 8 to FIG. 12. Here, FIG. 8 is a block diagram of a memory manager according to the present embodiment, FIG. 9 shows schematic views of a copy transfer control register and a copy sector number setting register. FIG. 10 shows a flow chart of sector copy (copy transfer) in the present embodiment, FIG. 11 shows a signal waveform of sector copy process in the present embodiment, and FIG. 12 shows a flow chart of a recording data merge process according to the present embodiment.

First, the memory manager shown in FIG. 8 is basically the same with the block diagram shown in FIG. 4, but is different in that a copy sector number setting register 416 is provided inside the control register part 41. The copy sector number setting register 416 holds information of sector copy inhibition/execution for each sector in one ECC block as shown in FIG. 9. While 32 bits are prepared as the copy sector number setting register 416 in FIG. 9 because FIG. 9 shows the case where one ECC block consists of 32 sectors, the copy sector number setting register 416 may include only 16 bits if one ECC block consists of 16 sectors.

In the copy sector number setting register 416 shown in FIG. 9, sector copy inhibition "0" or sector copy execution "1" is held in each bit. FIG. 9 also illustrates a schematic view of copy transfer control register, and includes the state that information of copy start bit, copy mode setting and copy end bit is held.

In the memory manager shown in FIG. 8, by providing the copy sector number setting register 416 that set a plurality of sector numbers to be sector-copied, the copy data transfer control sequencer 421 is able to copy the plurality of sectors successively according to the content of that register. Further, in Step S201 shown in FIG. 12, whether inputted data fills one ECC block is determined by the CPU 12. Further, the CPU 12 verifies, in Step S202 shown in FIG. 12, a sector number in which data is deficient, and sets that number in the copy sector number setting register 416. In Step S203, the number of sectors in which data is deficient is verified, and set in the number of copy sectors setting register 414.

Then in Step S204, whether recording is made on the optical disc corresponding to the sector number of the deficient data is determined. In Step S204, when there is a record on the optical disc, reproduction data is read out from the optical disc which is a destination of recording in Step S205, and the reproduction data is held in the read buffer 15. Step S206 is a process of waiting for completion of the process of reading out reproduction data from the optical disc.

Next, in Step S207, a head address of one ECC block of the read buffer 15 which is source of copy is instructed as a copy source address to the memory manager 4. Likewise, in Step S207, a head address of one ECC block of the write buffer 6 which is destination of copy is instructed as a copy destination address to the memory manager 4. Then in Step S207, information necessary for copy transfer such as copy source address and copy destination address is set in the control register part 41. In Step S208, sector copy is started according to the setting in Step S207.

In Step S209, whether copying of all sector numbers that are designated as "sector copy execution" (number of designated sectors) in the copy sector number setting register 416 has completed is determined. When it is determined that copy has completed in Step S209, the flow proceeds to Step S210 where data writing process is executed. Step S211 is a process of waiting for completion of data writing process. When it is determined that copy has not completed in Step S209, execution of sector copy is continued.

On the other hand, when it is determined in Step S204 that there is no record (unrecorded) on the optical disc, copy source address, copy destination address and the like are set while reproduction data to be copied is fixed at "0" in Step S220, and processes of Step S208 and Step S209 are executed.

Next, concrete process of the copy data transfer control sequencer 421 according to the present embodiment will be explained with reference to FIG. 10. First, in Step S20, whether the CPU 12 has instructed to start copy transfer is determined. Upon starting of copy transfer, in Step S21, the fact that copy mode is set at sector copy mode and sector designation is instructed to the address control 422 and the data transfer signal control 423. Here, the term sector designation means designating a sector number in the copy sector number setting register 416.

Next, in Step S22, sector copy inhibition/execution information of a designated sector number in the copy sector number setting register 416 shown in FIG. 9 is verified, and if the information represents execution, the flow proceeds to Step S23, and if the information represents inhibition, the flow proceeds to Step S24. In Step S23, an address of designated sector number is set with respect to the address control 422. On the other hand, in Step S24, a sector address is set sequentially from a head sector of one ECC block with respect to the address control 422.

Next, in Step S25, the address control 422 and the data transfer signal control 423 are instructed to copy and transfer data of one sector. Further, in Step S26, as shown in read data and write data in FIG. 11, data of 4 bytes is transferred for each address (#1, #2 etc.). Upon completion of data transfer of 4 bytes in Step S26, the address control 422 is instructed to increment address in Step S27. In the waveform of copy source/destination address shown in FIG. 11, the number is incremented in the order of copy source #1 address, copy destination #1 address, copy source #2 address, and copy destination #2 address in accordance with pulse of copy data transfer request.

Next, in Step S28, whether data transfer of one sector has completed is determined, and if not completed, the flow returns to Step S26, and if completed, the flow proceeds to Step S29. In the waveform of 2 KB counter shown in FIG. 11, the 2 KB counter turns to 0 from 2048 to complete the data transfer of one sector. Further, in Step S29, whether copy transfer of the number of sectors designated in the copy sector number setting register 416 has completed is determined, and if completed, the flow returns to Step S20, and if not completed, the flow returns to Step S22.

In the aforementioned conventional process, it is necessary for the CPU 12 to set address of next sector or number of sectors to be copied for every sector, which requires long processing time. However, in the flow chart shown in FIG. 10, the copy data transfer control sequencer 421 looks up the setting content of the copy sector number setting register 416 every time data transfer of one sector starts, and instructs an address of sector to be copied next, to the address control 422. This is because the copy data transfer control sequencer 421 manages the designated sector number in one ECC block by the copy sector number setting register 416.

The waveforms shown in FIG. 11 represents operation timing in the copy data transfer controller 42 when sector copy is executed for sector number 0 and sector number 8 by the copy sector number setting register 416. In the waveform shown in FIG. 11, the operation of switching from sector number 0 to sector number 8 is successive unlike the waveform shown in FIG. 6, and the CPU setting processing time for executing sector copy of eighth sector is no longer required.

As described above, the optical disc controller and optical disc drive system according to the present embodiment can dispense with the processing time for setting operation conducted for every sector by the CPU 12, by giving a sector number to be sector-copied to the memory manager 4 by the copy sector number setting register 416. This realizes reduction in execution time for copy required for recording data merge.

Second Embodiment

In the first embodiment, for supplementing data that is deficient in writing to the optical disc, the data to be supplemented is read out from the optical disc and temporally written into the read buffer of the buffer RAM as shown in FIG. 2. However, in the optical disc controller and optical disc drive system according to the present embodiment, ECC data (reproduction data) read out from the optical disc is not temporarily written into the read buffer of the buffer RAM, but is directly written into write buffer of buffer RAM while data which is unnecessary for supplement is masked.

Figure 13:
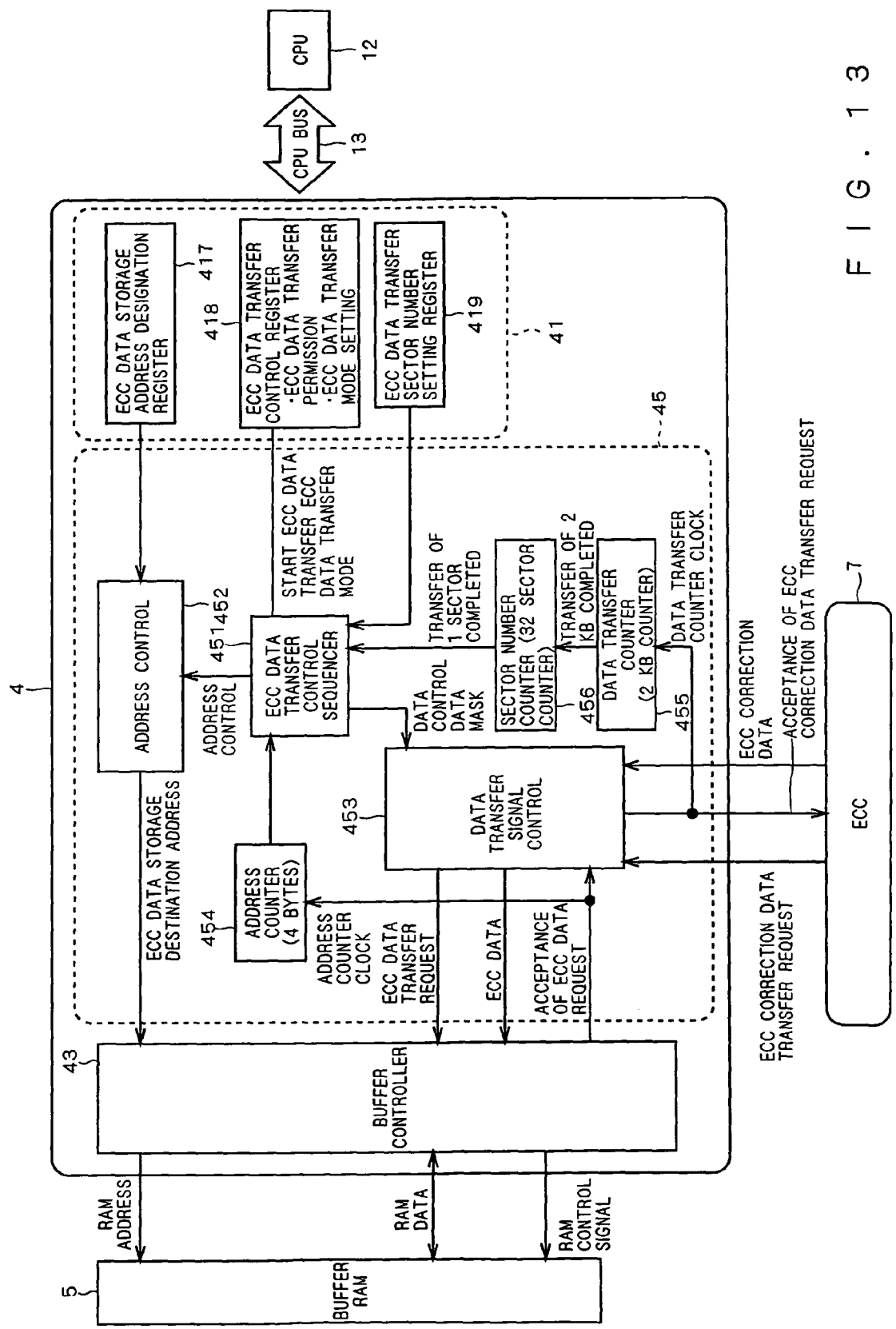
FIG. 13 shows a block diagram of an optical disc controller according to the second embodiment of the present invention.
Figure 14:
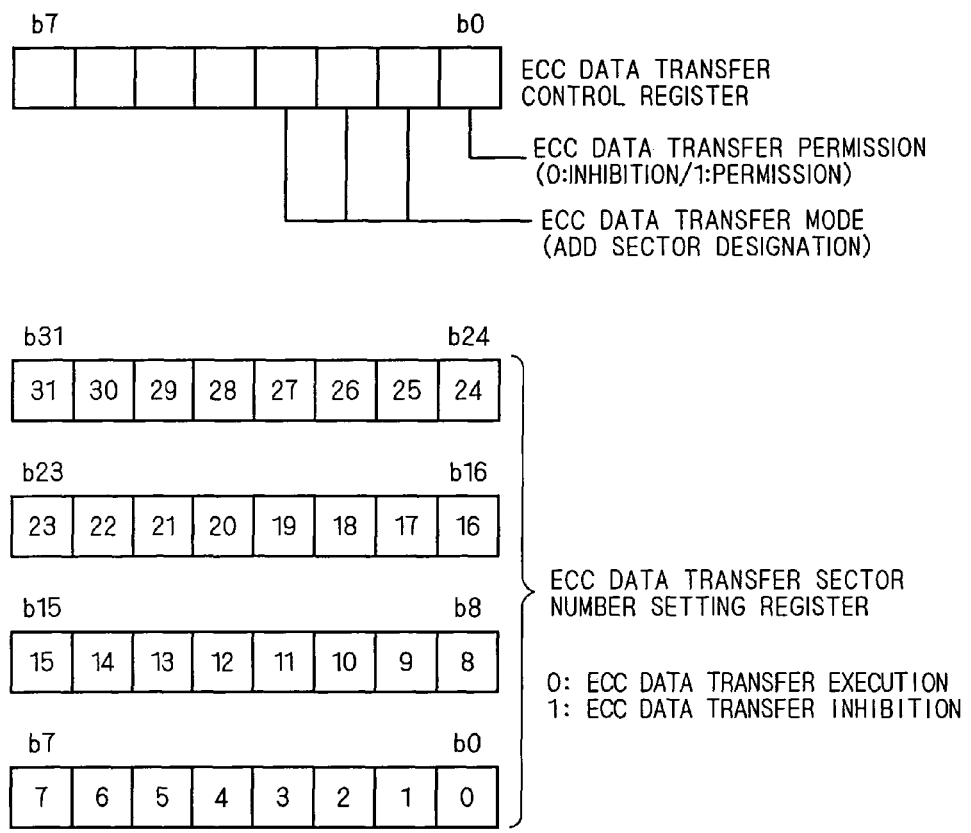
FIG. 14 shows schematic views of a copy transfer control register and a copy sector number setting register according to the second embodiment of the present invention.
Figure 15:
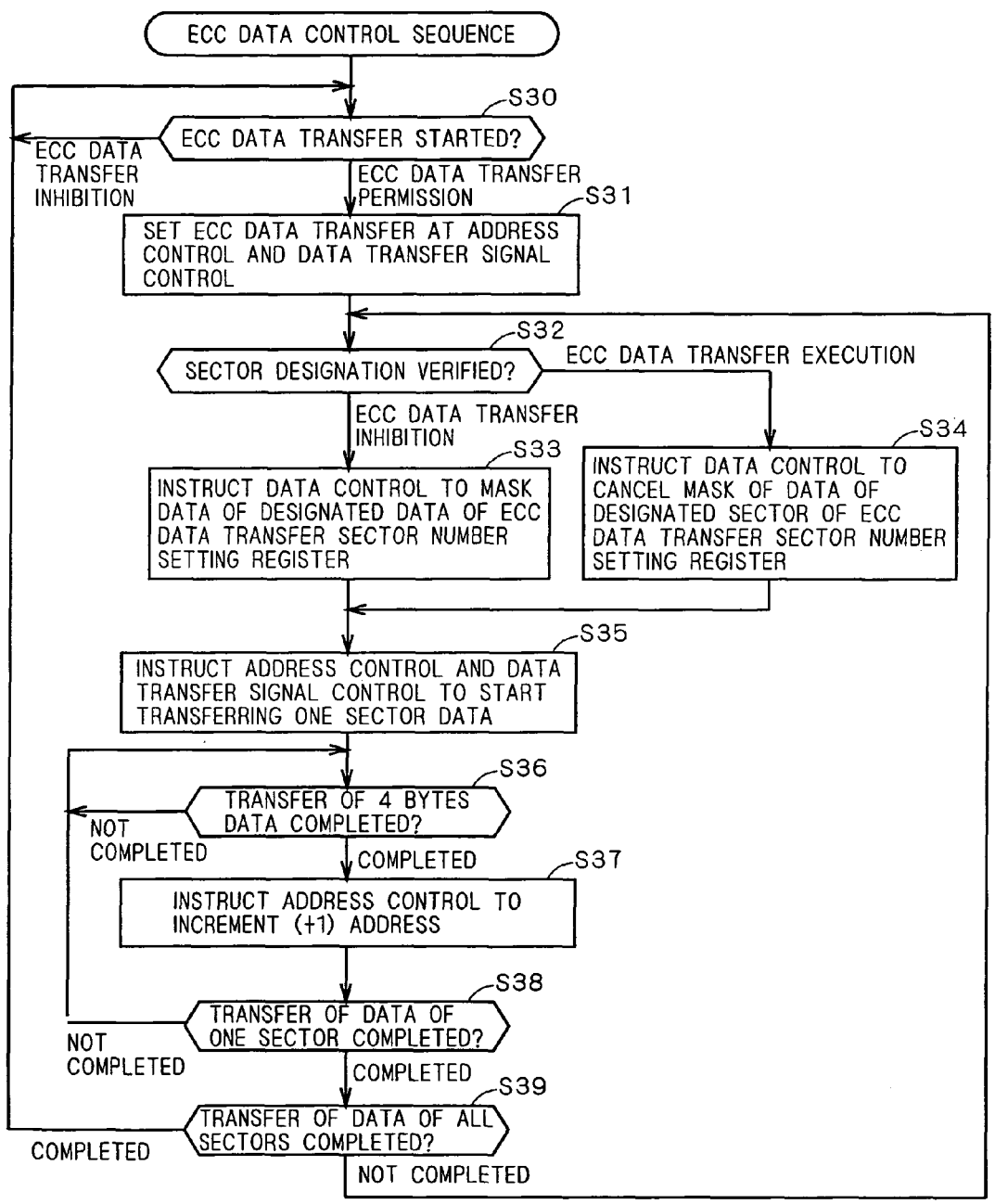
FIG. 15 shows a flow chart for explaining operation of copy data transfer control sequencer according to the second embodiment of the present invention.
Figure 16:
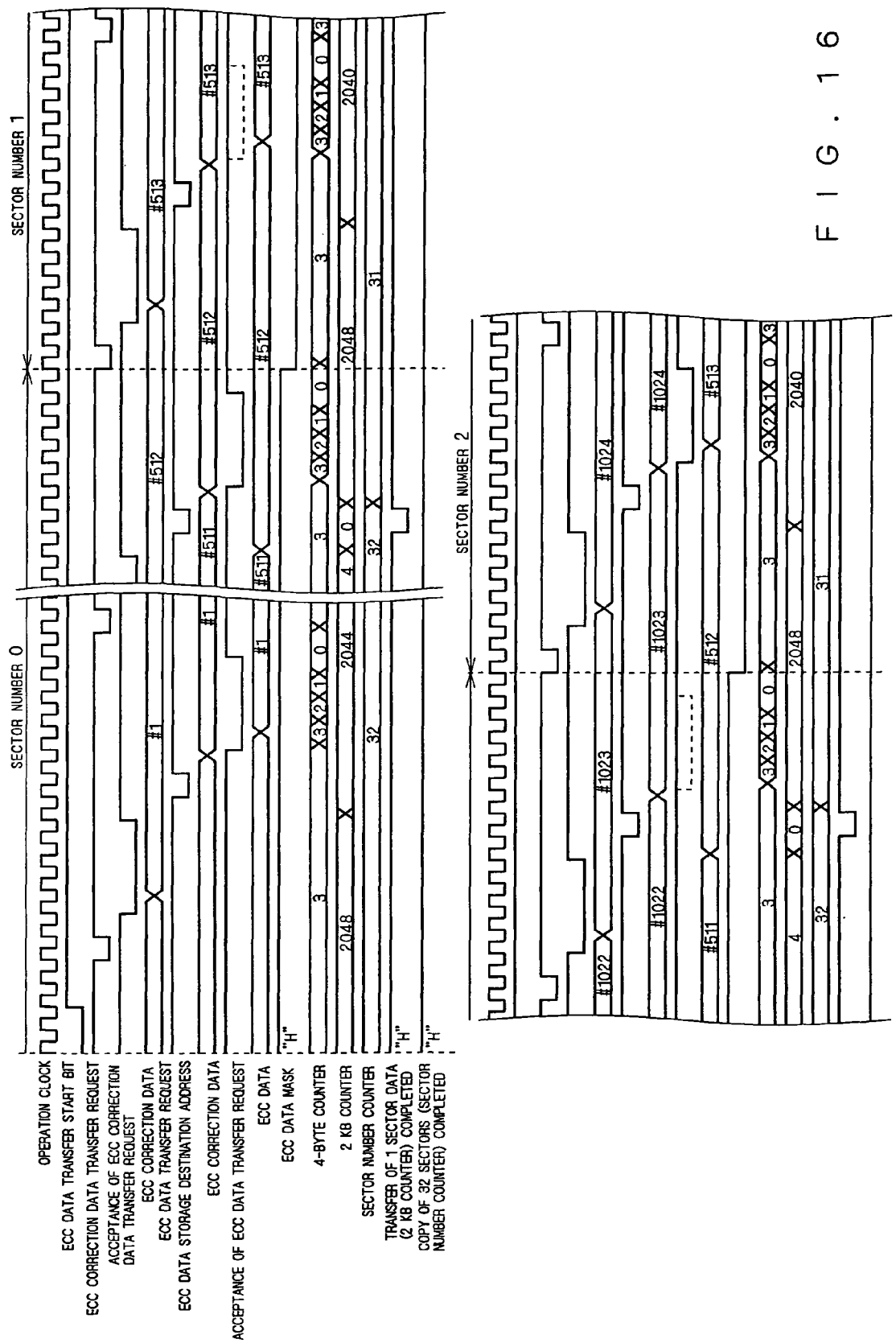
FIG. 16 shows a waveform chart for explaining operation of an optical disc controller according to the second embodiment of the present invention.
Figure 17:
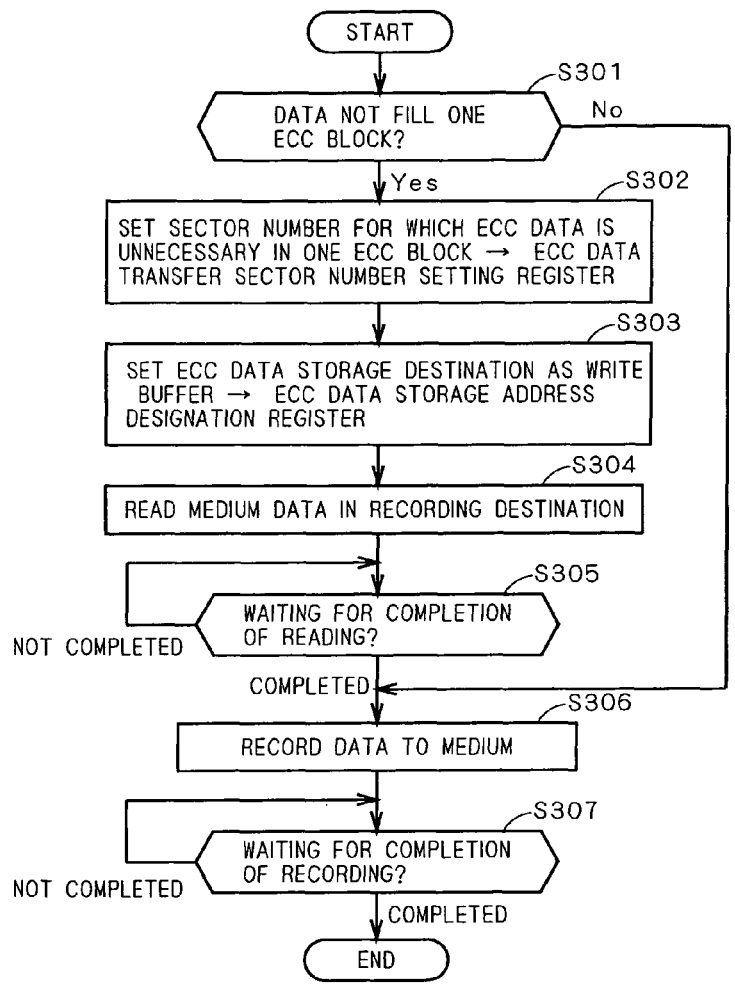
FIG. 17 shows a flowchart for explaining operation of an optical disc controller according to the second embodiment of the present invention.

In the following, referring to FIG. 13 to FIG. 17, explanation will be made for the optical disc controller and optical disc drive system according to the present embodiment. FIG. 13 shows a block diagram of a memory manager according to the present embodiment, and FIG. 14 show schematic views of a copy transfer control register and a ECC data transfer sector number setting register. FIG. 15 shows a flow chart of sector copy (copy transfer) in the present embodiment, FIG. 16 shows a signal waveform of sector copy process in the present embodiment, and FIG. 17 shows a flow chart of a recording data merge process in the present embodiment. Since configuration of the optical disc drive system according to the present embodiment is as same as that of the optical disc drive system shown in FIG. 1, a block diagram thereof is omitted.

First, the memory manager shown in FIG. 13 receives a control signal containing address and data from a CPU 12 via a CPU bus 13. In a memory manager 4, information that is necessary for ECC data transfer is taken out and held in a control register part 41 shown in FIG. 13. To be more specific, in the control register part 41, an address to which data is to be transferred is held in an ECC data storage address designation register 417 and ECC data transfer permission and ECC data transfer mode setting are held in an ECC data transfer control register 418. Further, an ECC data transfer sector number setting register 419 holds information concerning ECC data transfer inhibition/execution for each sector.

As shown in FIG. 14, the ECC data transfer sector number setting register 419 holds information about ECC data transfer permission/inhibition for each sector of one ECC block. While 32 bits are prepared as the ECC data transfer sector number setting register 419 in FIG. 14 because FIG. 14 shows the case where one ECC block consists of 32 sectors, the ECC data transfer sector number setting register 419 may include only 16 bits if one ECC block consists of 16 sectors. In the ECC data transfer sector number setting register 419 shown in FIG. 14, ECC data transfer execution is held as "0" and ECC data transfer inhibition is held as "1" in each bit.

FIG. 14 also includes a schematic view of a ECC data transfer control register, in which information about ECC data transfer permission and ECC data transfer mode are shown. To the information of ECC data transfer mode, information about sector designation is also added. Here, the term "sector designation" means designating a sector number in the ECC data transfer sector number setting register 419.

Further, the memory manager 4 shown in FIG. 13 has an ECC data transfer controller 45 for controlling ECC data transfer based on information held in the control register part 41. The ECC data transfer controller 45 executes process of ECC data transfer while an ECC data transfer control sequencer 451 controls address control 452 and data transfer signal control 453. In the memory manager 4 shown in FIG. 13, an address counter 454 is provided for control because ECC data is transferred in units of 4 bytes as can be seen from the waveform of 4-byte counter shown in FIG. 16. Further, in the memory manager 4 shown in FIG. 13, a data transfer counter 455 for counting data capacity of one sector (2 KB) and a sector number counter 456 for counting number of sectors that is copied and transferred are provided. Reading and writing processes of data from/to the buffer RAM 5 are executed via a buffer controller 43.

Upon reception of a transfer request of ECC correction data (data which is a base for ECC data (reproduction data)) read out from the optical disc from the ECC circuit 7, the data transfer signal control 453 gives acceptance of the ECC correction data transfer request to the ECC circuit 7. The ECC circuit 7 having received the acceptance of ECC correction data transfer request supplies the data transfer signal control 453 with ECC correction data.

Further, for writing ECC correction data from the ECC circuit 7 to the buffer RAM 5 as ECC data, the data transfer signal control 453 sends an ECC data transfer request to the buffer controller 43. The data transfer signal control 453 sends the ECC data transfer request based on the ECC data transfer sector number setting register 419. In other words, the data transfer signal control 453 sends a ECC data transfer request only for the sector number for which data transfer execution "1" is set in the ECC data transfer sector number setting register 419.

Upon reception of the ECC data transfer request, the buffer controller 43 sends acceptance of ECC data transfer request to the data transfer signal control 453. Upon reception of the acceptance of ECC data transfer request, the data transfer signal control 453 supplies ECC correction data to the buffer controller 43 as ECC data (reproduction data), and the buffer controller 43 writes the ECC data into the buffer RAM 5. In the present embodiment, masking of ECC data is realized by controlling the ECC data transfer request based on the ECC data transfer sector number setting register 419, however, in the present invention, masking of ECC correction data may be realized by controlling the ECC correction data transfer request, for example, based on the ECC data transfer sector number setting register 419 without limited to the above.

Next, the recording data merge process according to the present embodiment will be explained with reference to FIG. 17. First, in Step S301 shown in FIG. 17, whether inputted data fills one ECC block is determined by the CPU 12. The CPU 12 verifies a sector number in which data is deficient in Step S302 shown in FIG. 17, and sets a sector number that is unnecessary for ECC data transfer within one ECC block in the ECC data transfer sector number setting register 419. In Step S303, an address of write buffer to which ECC data is to be written is set at the ECC data storage address designation register 417.

Next, in Step S304, data is read out from the optical disc which is destination of recording, and ECC data for which execution is permitted in the ECC data transfer sector number setting register 419 is written into an address set in Step S303. As a result, for the data that is deficient in one ECC block, ECC data that is read out from the optical disc is directly written to supplement the data. That is, the processing time required for temporally storing ECC data that is read out from the optical disc in a read buffer and copying and transferring only necessary sector to a write buffer is reduced. Step S305 is a process of waiting for completion of the process of reading out data from the optical disc.

Next, in Step S306, a writing process of data that fills one ECC block as a result of supplement of data into the optical disc is executed. Step S307 is a process of waiting for completion of the data writing process.

Next, concrete process of the ECC data transfer control sequencer 451 according to the present embodiment will be explained with reference to FIG. 15. First, in Step S30, whether the CPU 12 has instructed to start ECC data transfer is determined. As the ECC data transfer starts, ECC data transfer settings such as ECC data transfer permission and sector designation are instructed to the address control 452 and the data transfer signal control 453 in Step S31.

Next, in Step S32, ECC data transfer inhibition/execution information of designated sector number within the ECC data transfer sector number setting register 419 shown in FIG. 14 is verified, and the flow proceeds to Step S33 when the information represents inhibition, or to Step S34 when the information represents execution. In Step S33, the address control 422 is instructed to mask ECC data of the sector number that is designated in the ECC data transfer sector number setting register 419. On the other hand, in Step S34, the address control 422 is instructed to cancel the mask of ECC data of the sector number that is designated in the ECC data transfer sector number setting register 419.

Next, in Step S35, instruction to conduct ECC data transfer of one sector is given to the address control 452 and the data transfer signal control 453. Further, in Step S36, data of 4 bytes is transferred for each address (#1, #2 etc.) as shown in read data and write data of FIG. 16. Upon completion of data transfer of 4 bytes in Step S36, the address control 422 is instructed to increment address in Step S37. In waveform of copy source/destination address shown in FIG. 16, the number is incremented in the order of copy source #1 address, copy destination #1 address, copy source #2 address, and copy destination #2 address in accordance with pulse of copy data transfer request.

Next, in Step S38, whether data transfer of one sector has completed is determined, and if not completed, the flow returns to Step S36, and if completed, the flow proceeds to Step S39. In the waveform shown in FIG. 16, 2 KB counter turns to 0 from 2048 to complete data transfer of one sector. Further, in Step S39, whether copy transfer of the number of sectors that is designated in the ECC data transfer sector number setting resister 419 has completed is determined, and if completed, the flow returns to Step S30, and if not completed, the flow returns to Step S32.

In the waveform shown in FIG. 16, ECC data transfer inhibition is set for the sector number 1 in the ECC data transfer sector number setting register 419. Therefore, in the waveform shown in FIG. 16, switching to ECC data transfer inhibition occurs from sector number 0 to sector number 1, while switching to ECC data transfer execution occurs from sector number 1 to sector number 2. According, in the waveform shown in FIG. 16, ECC data mask signals changes from "H" to "L" in sector number 1, while signals of ECC data transfer request and ECC data transfer request acceptance remain unchanged (represented by broken lines in the drawing).

In the present embodiment, when data that is inputted at the time of writing into the optical disc does not fill one ECC block, data of one ECC block is created by directly writing ECC data which is already recorded data, into write buffer of the deficient data. When there is no record, ECC correction data supplied from the ECC circuit 7 may be transferred as data of "0".

As described above, the optical disc controller and optical disc drive system according to the present embodiment dispenses with copy transfer process of reproduction data as described in the first embodiment, leading reduction in the processing time in generating data that does not fill one ECC block.

While the invention has been shown and described in detail, the foregoing description is in all aspects illustrative and not restrictive. It is therefore understood that numerous modifications and variations can be devised without departing from the scope of the invention.

What is claimed is:

1. An optical disc controller for controlling reading and writing of data from/to an optical disc in which data is recorded while divided into data capacity units for which an error correction code can be added, the controller comprising:
an interface circuit for controlling input/output of data with respect to an external device;
a buffer for holding data inputted from said interface circuit in units for which said error correction code is added;
a memory manager for controlling reading and writing of data from/to said buffer;
an ECC circuit for adding said error correction code to data held in said buffer;
a modulation circuit for modulating data for which said error correction code is added in said ECC circuit into a predetermined format; and
an operation processor for controlling said interface circuit, said memory manager, said ECC circuit and said modulation circuit,
wherein said memory manager includes:
a control register part having a plurality of registers for taking out and holding information necessary for transfer of reproduction data, from a control signal of said operation processor that instructs said buffer to transfer reproduction data from said ECC circuit in units of sectors for deficient data, when the data inputted at the time of writing into said optical disc from said interface circuit does not fill the unit for which said error correction code is added;

a reproduction data controller for controlling transfer of said reproduction data to said buffer from said ECC circuit based on said information from said control register part; and a buffer controller for controlling reading and writing of said reproduction data from/to said buffer based on an instruction from said reproduction data transfer controller, said control register part further including a reproduction data transfer sector number setting register that takes out plural sector numbers of deficient data from said control signal of said operation processor, and holds said reproduction data as transfer execution/inhibition information; and wherein said reproduction data transfer controller directly transfers said reproduction data from said ECC circuit to said buffer based on said transfer execution/inhibition information.

2. An optical drive system comprising:

a laser diode for executing reading/writing of data from/to an optical disc in which data is recorded while divided into data capacity units for which an error correction code can be added;

the optical disc controller according to claim 1; and a laser diode driver for converting output from said modulation circuit of said optical disc controller into an input signal for said laser diode.

* * * * *